(12) United States Patent
Falter et al.

(10) Patent No.: US 11,481,366 B2
(45) Date of Patent: Oct. 25, 2022

(54) CONSUMING APPLICATION-OWNED DATABASE OBJECTS VIA SQL

(71) Applicant: SAP SE, Walldorf (DE)

(72) Inventors: Timm Falter, Sinsheim-Hilsbach (DE); Torsten Ziegler, Dielheim (DE); Arne Harren, Walldorf (DE)

(73) Assignee: SAP SE, Walldorf (DE)

( * ) Notice: Subject to any disclaimer, the term of this patent is extended or adjusted under 35 U.S.C. 154(b) by 366 days.

(21) Appl. No.: 16/742,458

(22) Filed: Jan. 14, 2020

(65) Prior Publication Data
US 2021/0216510 A1 Jul. 15, 2021

(51) Int. Cl.
*G06F 16/21* (2019.01)
*G06F 16/906* (2019.01)
*G06F 21/62* (2013.01)
*G06F 9/54* (2006.01)

(52) U.S. Cl.
CPC .............. *G06F 16/212* (2019.01); *G06F 9/54* (2013.01); *G06F 16/906* (2019.01); *G06F 21/6218* (2013.01)

(58) Field of Classification Search
CPC ........ G06F 16/212; G06F 9/54; G06F 16/906; G06F 21/6218; G06F 2221/2141
See application file for complete search history.

(56) References Cited

U.S. PATENT DOCUMENTS

2018/0285390 A1* 10/2018 Mayer .................... G06F 9/451
2020/0004847 A1* 1/2020 Bagga ................ H04L 67/2838
2021/0191740 A1* 6/2021 Richards ............. G06F 16/9574

* cited by examiner

*Primary Examiner* — Hosain T Alam
*Assistant Examiner* — Chongsuh Park
(74) *Attorney, Agent, or Firm* — Sterne, Kessler, Goldstein & Fox P.L.L.C.

(57) ABSTRACT

Disclosed herein are system, method, and device embodiments for consuming application-owned database objects via an API schema. An embodiment operates by determining that an application-owned database object is classified as API exposable, creating an API schema for proxy access to database objects that have been identified as API exposable, generating an API object within the API schema based on assigning the database object to the API schema, and providing, via the API schema and independent of the application, access to the API object by a privileged consumer.

19 Claims, 5 Drawing Sheets

CONSUMING APPLICATION-OWNED DATABASE OBJECTS VIA SQL

BACKGROUND

In some instances, an application (e.g., Advanced Business Application Programming (ABAP) application) may manage a plurality of database objects of a database system. As such, consumers are unable to reliably access the database objects without using the application. For example, database-level access to the database objects may be frustrated by mutable application-managed implementation details, the lack of a well-defined access interface, application-based lifecycle management of the database objects, or reliance on session variables which are set during access via the application. In some other examples, database-level access may be prohibited as a security detail. Further, some consumers may be unable to utilize the application to access the database objects due to interoperability issues (e.g., a consumer may utilize an access protocol or application platform incompatible with the application).

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for consuming application-owned database objects via an application programming interface (API) schema.

Figure 1A:
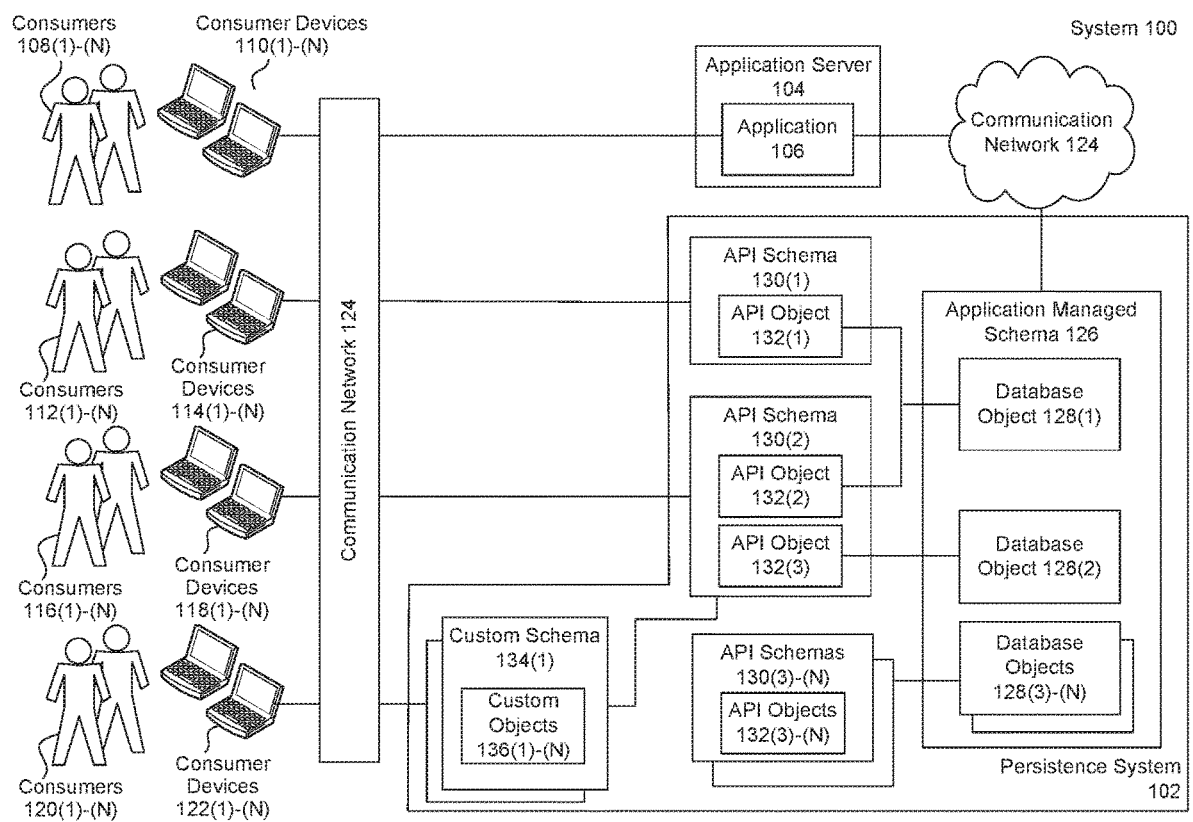
FIG. 1A is a block diagram of an example framework for consuming application-owned database objects via an API schema, according to some embodiments.

FIG. 1A illustrates a block diagram of an example framework for consuming application-owned database objects via an API schema in a computing system 100, according to some embodiments. As illustrated in FIG. 1A, the computing system 100 includes a persistence system 102 (e.g., a database server), an application server 104 including an application 106, one or more consumers 108(1)-(N) associated with one or more consumer devices 110(1)-(N), one or more consumers 112(1)-(N) associated with one or more consumer devices 114(1), one or more consumers 116(1)-(N) associated with one or more consumer devices 118(1)-(N), and one or more consumers 120(1) associated with one or more consumer devices 122(1)-(N).

As used herein, a "persistence system" may refer to a software system that handles the storage, retrieval, and updating of data in a database (e.g., a database management system). As used herein, and in some embodiments, a "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Some examples of the consumer devices 110, 114, 118, and 122 include smart phones and mobile communication devices; tablet computing devices; wearable computing devices; desktops, laptops, netbooks and other portable computers, appliance, IoT (internet of things) device, and/or any other device capable of communicating with the persistence system 102 or the application server 104. Additionally, the persistence system 102, the application server 104, and the consumer devices 110, 114, 118, and 122 may communicate via a communication network(s) 124. The communication network 124 may include any combination of a private network, personal area network (PAN), Local-Area Network (LAN), Wide-Area Network (WAN), or the Internet. Further, the connection between the persistence system 102, the application server 104, or the consumer devices 110, 114, 118, and 122, and the communication network 124 may be a wireless connection (e.g., Bluetooth or other short range wireless technology, cellular, Wi-Fi connection, etc.), or a wired connection (e.g., Ethernet, universal serial bus (USB), etc.), or a combination thereof.

As used herein, an "application server," may refer to a server designed to install, operate, and/or host applications and associated services. For example, as shown in FIG. 1A, the application 106 may execute on the application server 104. As used herein, in some embodiments, an "application" may refer to any application or software operable to run on any device and perform a particular task. In some embodiments, the application 106 may be an ABAP application developed using the ABAP programming language and/or the ABAP platform.

The application server 104 may be a platform as a service (PaaS) or an application platform as a service (aPaaS) that provides core services to the application 112. Additionally, use of the application server 104 may allow the application 106 to scale with business needs and delegate infrastructure and system operations to the application server 104. Some examples of core services include application analytics, application resources, data integration, HTTP configuration, HTTPS configuration, lifecycle management, push notifications, security services, system health monitoring, etc. Additionally, or alternatively, the application server 104 may be a multi-tenant system. As used herein, and in some embodiments, the term "multi-tenant system" refers to those systems in which various elements of hardware and software of the system may be shared by one or more customers of the multi-tenant system operator.

In addition, the persistence system 102 may be a PaaS or a aPaaS that provides a database platform to a client application on the consumer devices 110, 114, 118, and 122. Additionally, or alternatively, the application server 104 may be a multi-tenant system. As an example, customers of the persistence system 102 may rely on the persistence system 102 to provide one or more services to the consumer devices 110, 114, 118, and 122.

As illustrated in FIG. 1A, the persistence system 102 may include an application-managed schema 126 including a plurality of database objects 128(1)-(N). The persistence system 102 may store the database objects 128(1)-(N) as a result of the execution of the application 106 on the application server 104. In some embodiments, the persistence system 102 may be an ABAP database that stores the database objects 128(1)-(N). Some examples of the database objects 128(1)-(N) include database tables, table functions, database views, hierarchies, or stored procedures.

Further, the consumer devices 110(1)-(N) may access the database objects 128(1)-(N) via the application 106. For example, the consumer devices 110(1)-(N) may execute a client application that requests the database objects 128(1)-(N) from the application 106. In response to the requests, the application 106 requests the database objects 128(1)-(N) from the persistence system 102. In some embodiments, the requests from the application 106 to the persistence system 102 may be structured query language (SQL) requests for the database objects 128(1)-(N).

The database objects 128(1)-(N) may be inaccessible via database-level access or unreliably accessible via database-level access. In other words, access to the database objects 128(1)-(N) may limited to access via the application 106. For example, database-level access may be prohibited for security purposes. As another example, the application-managed schema 126 may lack a well-defined interface, access to the database objects 128(1)-(N) may be based on mutable implementation details (e.g., the name or structure of the database) managed by the application 106, the lifecycle of the database objects 128(1)-(N) may be managed by the application 106, and/or access to the database objects 128(1)-(N) may depend on session variables which are only set during access via the application.

In some examples, the database objects 128(1)-(N) might contain client-handling related aspects. For instance, an ABAP-owned database object might contain ABAP client-handling related aspects, e.g. a client field in the table structure or an implicit client filtering inside a view definition. When a database object 128 containing client-handling related aspects is exposed, the persistence system 102 may perform plain exposure of the corresponding of API object 132 and the client field with no implicit client filtering, or a dedicated API object for a particular client. For exposure via a dedicated API object 132 for a particular client, a wrapper object shall be creatable which sets the session variable for the processing of all its inner objects (e.g. queries).

Embodiments herein disclose providing API schemas 130(1)-(N) including database-level proxy objects (i.e., the API objects 132(1)-(N)) that provide access to the database objects 128(1)-(N) without use of the application 106. For example, the API object 132(1) may be provided as a proxy for the database object 128(1). Further, the consumer devices 114(1)-(N) associated with the API schema 130(1) may send requests to the persistence system 102 for the API object 132(1) in order to access persistence information corresponding to the database object 128(1). Thus, embodiments disclosed herein provide advantages over prior art systems that failed to provide a means for permitting consumers to build tools that could reliably access the database objects 128(1)-(N) without relying the application 106.

In some embodiments, individual API schemas 130 target a particular use case or type of consumer. Therefore, an individual API schema 130 may contain a tailored set of API objects 132. For example, as illustrated in FIG. 1A, the API schema 130(1) may include the API object 132(1) as a proxy access object for the database object 128(1), and the API schema 130(2) may include the API object 132(2) as a proxy access object for the database object 128(1) and the API object 132(2) as a proxy access object for the database object 128(2). Additionally, the consumers 112 and/or the consumer devices 114(1)-(N) may be given access rights to the API objects (e.g., API object 132(1)) of the API schema 130(1), and the consumers 116(1)-(N) and/or the consumer devices 118(1)-(N) may be given access rights to the API objects (e.g., the API objects 132(2)-(3)) of the API schema 130(2).

In some embodiments, the access rights to the API schemas 130(1)-(N) may be assigned to the consumers 108(1)-(N), 112(1)-(N), 116(1)-(N), and 120(1)-(N) and/or consumer devices 110(1)-(N), 114(1)-(N), 118(1)(N), and 122(1)-(N) based upon a role, job title, project, workflow, department, group, organization, location, and/or privilege associated with the respective consumers 108, 112, 116, and 120 and/or consumer devices 110, 114, 118, and 122(1)-(N). For example, the API schema 130(1) may be associated with an accounting department of an organization and the API object 132(1) may be a proxy access object for the database object 128(1) that includes financial information. Further, the API schema 130(2) may be associated with an executive department of an organization, and the API object 132(2) may be a proxy access object for the database object 128(1) that includes financial information, and the API object 132(2) may be a proxy access object for the database object 128(2) that includes human resources information.

As shown in FIG. 1A, the persistence system 102 may include one or more custom schemas 134(1)-(N). A custom schema may include a plurality of custom objects 136(1)-(N). Some examples of custom objects include database views and procedures. In some embodiments, a custom schema 134 may be created to present a modified schema based on an API schema 130. For instance, the custom schema 134(1) may include custom objects 136(1)-(N) based on the API object 132(3) of the API schema 130(2). Additionally, as illustrated in FIG. 1A, the consumers 120(1)-(N) and/or the consumer devices 122(1)-(N) may be given access rights to the custom objects 136(1)-(N) of the custom schema 134(1). The custom schema 134(1) may be used to present the consumers 120(1)-(N) with a limited or specialized selection of the resources (e.g., the API objects 132(2)-(3)) of the API schema 130(2). In some instances, a custom schema 134 may be employed as an alternative to implementing object-level permissions for the API objects 132(2)-(3) within the API schema 130(2).

In some embodiments, configuring the persistence system 102 includes initializing a database account having a first permission enabling the database account to create schema-local database roles, and a second permission enabling the user to create API schemas (e.g., API schemas 130(1)-(N)) within the persistence system 102. The database account may be employed for the creation of API schemas and creating/granting of related access roles, but not the creation of the API objects.

In addition, the persistence system 102 may include two schema-local roles for the API schemas. The first schema-local role may have CRUD privileges (e.g., SELECT, INSERT, UPDATE and DELETE privileges in a SQL system) and be disabled from assigning CRUD privileges to other users (e.g., lacking GRANT OPTION privileges in a SQL system). An account may be granted the first schema-local role to configure the account for direct access to the particular API schema. The second schema-local role may have CRUD privileges and be enabled to assign CRUD privileges to the other users (e.g., possessing GRANT OPTION privileges in a SQL system). The second schema-role may be granted to consumers that need view building capabilities (e.g., the ability to build views in a custom schema and provide them to other database users), and the ability to directly access the API objects. Further, the first and second schema-local roles may be granted by a database-level administrator (e.g., a ROLE admin in a SQL system) to the consumers 108, 112, 116, and 120. For example, a database account associated with the consumer 112(1) may be granted the first schema-local role to directly access the API object 132(1).

In some embodiments, an individual database object 128 may include an attribute indicating whether the database object 128 has been classified as exposable via an API schema (e.g., the API schemas 130(1)-(N)). For instance, a sufficiently privileged database account (e.g., an administrator) associated with the application managed schema 126 may classify a database object 128 as exposable via an API schema. In addition, database objects that have been classified as API exposable may be further classified as read-only or read-write. In some embodiments, an API exposable database table may be exposed with distinguishable read and write properties. When the database object is a read-only database table, the read-only database table can be implemented via a read-only view as an API object. Further, when the database object is an API exposable database view, the database view may be exposed as a read-only view because complex views are usually not updatable. When the database object is an API exposable stored procedure, the stored procedure may be exposed as a stored procedure having the same read-only/read-write property as defined in the API exposable procedure.

Once a database object 128 is classified as API exposable, the persistence system 102 may apply modification constraints to the database object 128 to protect the integrity of the relationship between the database object 128 and its corresponding API object 132. In some embodiments, the modification constraints applied to exposable database objects 128 may be captured in an API contract which indicates impermissible and permissible modifications to an API-exposable database object. The modification constraints ensure a stable public interface for the accessing the API objects by forbidding changes to the database objects that would break the API contract relied upon by software tools depending on the API objects, and assures consumers that stable tools can be built to use the API objects.

In some embodiments, the existence of the API contract prevents changes to exposable database objects that would remove or edit existing parameters, fields/elements, relationships to other database objects, and/or associated data types. In some instances, the API contract may permit the addition of optional parameters, fields/elements, or relationships to exposable database objects. Further, to ensure that consumers of the API objects do not need to be adjusted after an upgrade, the prolongation of the fields/elements and parameters of a database object is not allowed. Further, in some instances, the default classification for the database objects is not API-exposable given the modification restraints.

Once a database account has been granted the right to create API schemas, the database account may create an API schema for proxy access. Further, the user account may select exposable database objects to access via the API objects of the API schema. For example, a user account may create the API schema 130(1), and provide a logical name for the API schema 130(1). In addition, the database account may associate the database object 128(1) to the API schema 130(1), and provide a name for the corresponding API object 132(1) within the API schema 130(1). In some embodiments, the database account may utilize a schema editor application to create and manage the API schema 130(1). In some embodiments, creation of the API schema 130(1) may also include configuring a client access mode (e.g., read-only access or read-write access) for the API objects of the API schema and other client settings, and recording a modification timestamp for the API objects. The modification timestamp may be used to determine whether an API object needs to be refreshed/re-created during a API schema reactivation.

In some embodiments, each of the database objects 128 (1)-(N), API schemas 130(1)-(N), and the custom schemas 134(1)-(N) have an owner with ownership privileges. An owner of a database object 128 may set whether the database object 128 is API exposable. An owner of an API schema 130 may determine whether an API exposable database object 128 will be exposed within the API schema 130 as an API object 132. An owner of a custom schema 134 may generate a custom object 136 that provides an API object 132 of an API schema 130. Further, as described herein, the owner of a database object 128 may grant a permission to the owner of an API schema 130 to expose the database object 128 in the API schema 130. Similarly, the owner of the API schema 130 may grant a permission to the owner of a custom schema 134 to provide access to an API object 132 of the API schema 130 via the custom schema 134 as a custom object 136.

The activation process may include creating the API schema 130(1), creating the two schema-local database roles for the API schema 130(1), and granting a database account particular granting privileges (e.g., grant CREATE ANY to administrator account in a SQL system) for the API schema 130(1). The activation process may further include determining that database objects (e.g., the database object 128 (1)) associated with the API schema 130(1) are active at an application layer. For example, in an ABAP system, the ABAP system may determine whether the ABAP objects (e.g., the database objects 128(1)-(N)) are active at a database dictionary level or an ABAP application level. If any of the ABAP objects are inactive, the activation process may fail.

The activation process may further include triggering the creation or recreation of the API objects (e.g., the API object 132(1)) of the API schema (API schema 130(1)). In some embodiments, the activation process may be executed in response to the creation of the API schema 130(1), the addition of a new API object to the API schema 130(1), the modification of an API object (e.g., the API object 132(1)) of the API schema 130(1), transport of database object 128(1) or an API schema 130, or a permitted modification to a database object (e.g., the database object 128(1)) assigned to the database schema 130(1). The activation process may further include triggering the creation or re-creation of the API objects that provide database procedures or table functions.

The final step of activation includes creating or recreating the API objects. When the activation process includes recreating API objects, the API objects are recreated with their new properties and updated timestamp information. The timestamp information may be subsequently used to determine the staleness of an API object and whether the API object needs to be recreated during a later activation process. Additionally, the timestamp information may be used for book keeping, reconciliation activities, and problem analysis.

Figure 1B:
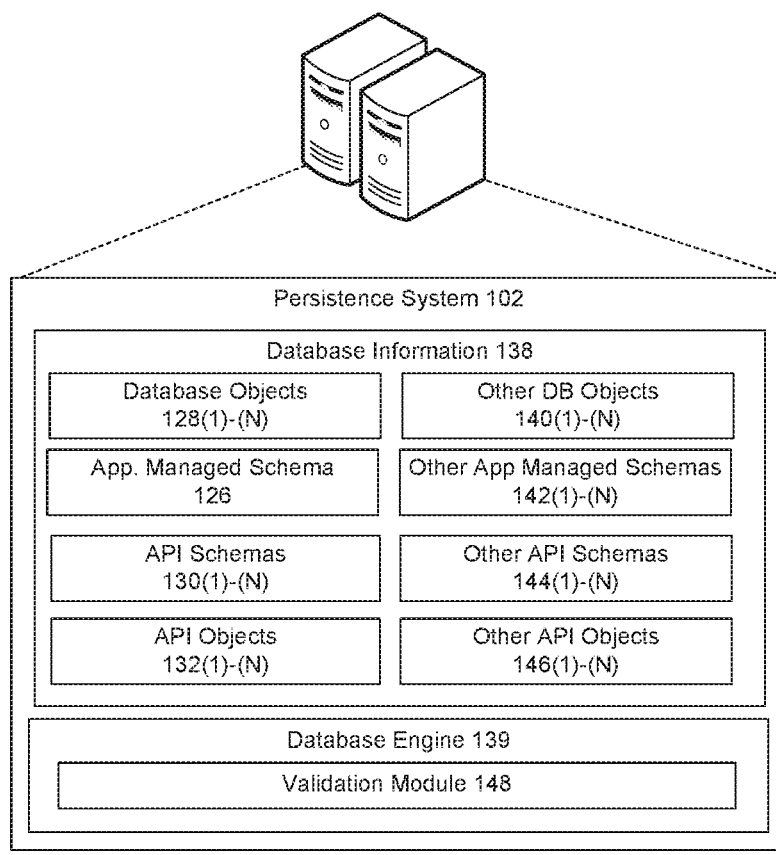
FIG. 1B is a block diagram of an example computing system for providing application-owned database objects via an API schema, according to some embodiments.

FIG. 1B is a block diagram of an example persistence system for providing application-owned database objects via an API schema, according to some embodiments. As illustrated in FIG. 1B, the persistence system 102 may include the database information 138 and the database engine 139. The database information 138 may include the database objects 128(1)-(N) of the application managed schema 126 managed by the application 106. Further, the database information 138 may include other database objects 140(1)-(N) associated with other application managed schemas 142(1)-(N) managed by the application 106 or other applications.

The database information 138 may also include the API schemas 130(1)-(N) for the API objects 132(1)-(N) associated with the application managed schema 126 and the database objects 128(1)-(N). Further, the database information 138 may also include other API schemas 144(1)-(N) for other API objects 146(1)-(N) associated with the other application managed schemas 142(1)-(N) and the other database objects 140(1)-(N).

The database engine 139 may be configured to execute database commands within the persistence system 102. For instance, the database engine 139 may be configured to create, retrieve, update, and delete database objects (e.g., the database objects 128(1)-(N) and the other database objects 140(1)-(N)) within the persistence system 102. Further, the database engine 139 may be configured to manage database transactions, database indexes, backup operations, workload replay, shadowing, etc.

As illustrated in the FIG. 1B, the database engine 139 may include a validation module 148 configured to enforce modification restraints on the database objects 128(1)-(N) and the other database objects 140(1)-(N). For instance, the validation module 148 may permit or deny modification commands over the database object 128(1) based on the database object 128(1) being API exposable. If the modification command would break the API contract of the API object 132(1) associated with the database object 128(1), the validation module 148 may prevent execution of the modification command. As discussed herein, the validation module 148 may prevent changes to API exposable database objects that would remove or edit existing parameters, fields/elements, relationships to other database objects, and/or associated data types. In some embodiments, the validation module 148 may enforce API contract compatibility at a layer where metadata is managed or the database objects 128(1)-(N) are created or modified. For example, the validation module 148 may validate the API contract compatibility of a database operation within the application server 104.

In addition, the validation module 148 may enforce access rights over the database information 138. As an example, the validation module 148 may ensure that only the consumers 112(1)-(N) and the consumer devices 114(1)-(N) are provided access to the API object 132(1).

Figure 2:
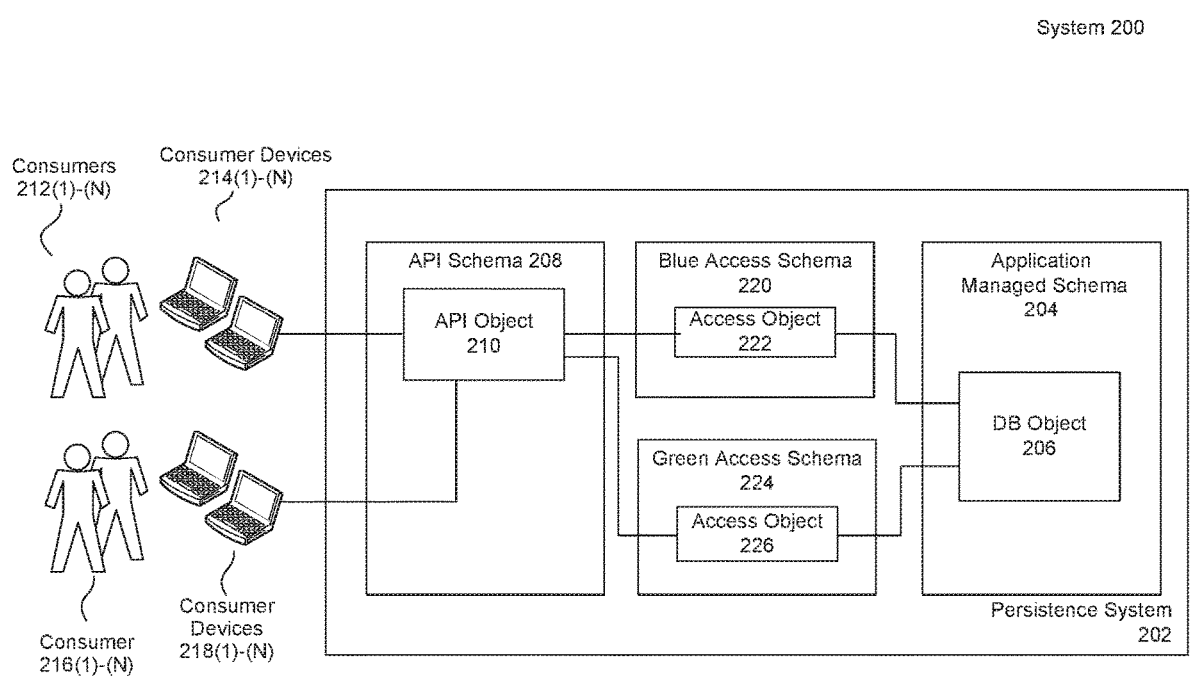
FIG. 2 is a block diagram of an example framework for consuming application-owned database objects via an API schema, according to some embodiments.

FIG. 2 illustrates a block diagram of an example framework for consuming application-owned database objects via an API schema in a computing system 200, according to some embodiments. As illustrated in FIG. 2, the persistence system 200 includes an application managed schema including a database object 206, an API schema 208 including a API object 210 that acts as a proxy access object for the database object 206. Further, the consumers 212(1)-(N) and the consumers 214(1)-(N) may be associated with the API schema 208. For example, the consumers 212(1)-(N) may use the consumer devices 216(1)-(N) to access the API object 210, and the consumers 214(1)-(N) may use the consumer devices 218(1)-(N) to access the API object 210.

As used herein, "blue-green deployment," may refer to a technique that reduces downtime and risk by running two identical production environments called blue and green. The blue environment may be a live environment and the green environment may be an idle environment. During development of a new version of a software application or software data, deployment and testing may take place in the idle environment (i.e., the green environment). Once the upgraded version has been deployed and fully tested, the green environment becomes the live environment and the blue environment becomes the green environment.

The persistence store 202 may be configured to provide blue-green deployment capabilities. For example, the persistence store 202 may include a blue access schema 220 with an access object 222, and a green access schema 224 with an access object 226. The blue access schema 220 of the persistence store may be the live environment and contain an access object 222 for the database object 206, and the API object 210 in the API schema 208 may direct live requests to the access object 222. During the upgrade process, green access schema 224 may be populated with a new access object 226 for the updated version of database object 206. When the upgrade is completed, the API object 210 will be re-created or replaced to direct live requests to the access object 226 in the green access schema 224. For example, the consumers 214(1)-(N) may be software testers, and the API object 210 may route requests received from the consumer devices 214 to the access object 222 of the blue access schema 220, and requests received from the consumer devices 218(1)-(N) to the access object 226 of the green access schema 214 prior to deployment of the updated version of database object 206. Once deployment and testing is complete, the API object 210 may direct requests received from the consumer devices 214(1)-(N) and the consumer devices 218(1)-(N) to the access object 226.

Figure 3:
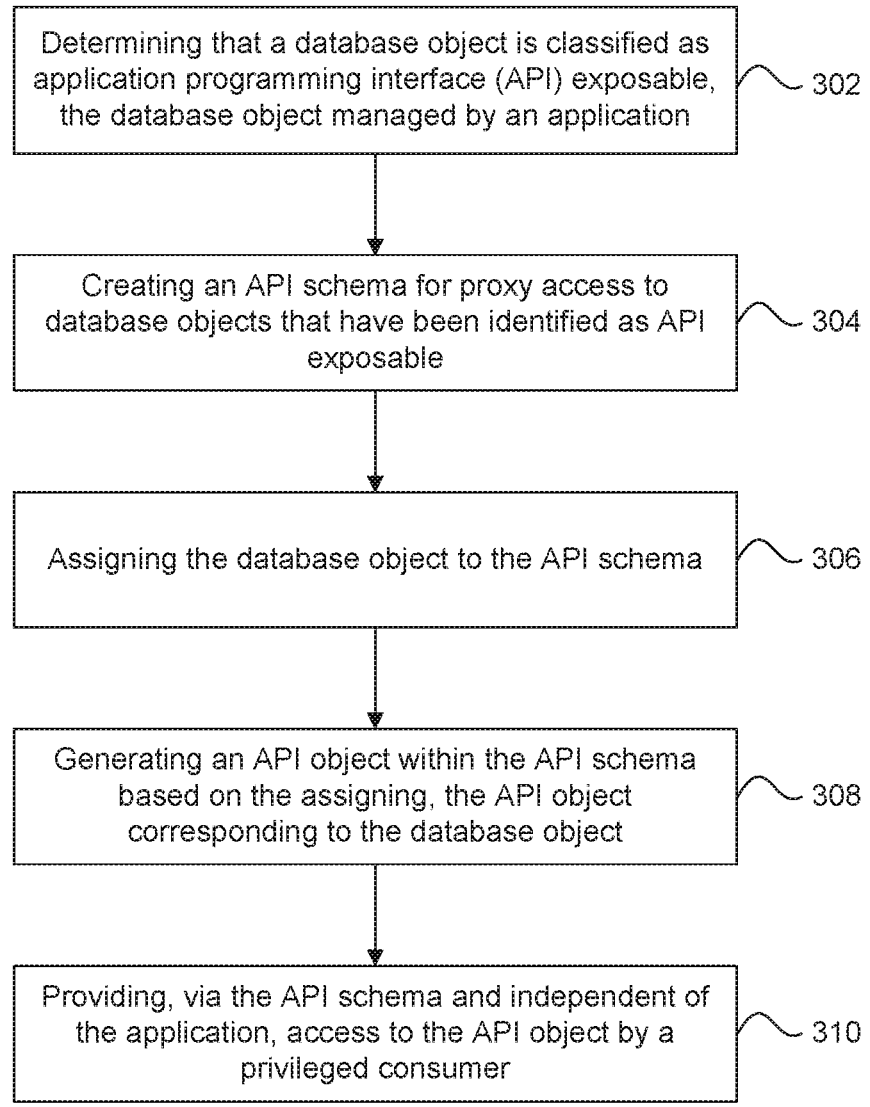
FIG. 3 is a flowchart illustrating a process for consuming application-owned database objects via an API schema, according to some embodiments.

FIG. 3 is a flowchart of a method 300 for consuming application-owned database objects via an API schema. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1A, 1B, and 2. However, method 300 is not limited to that example embodiment.

In 302, the persistence system may determine that a database object is classified as application programming interface (API) exposable, the database object managed by an application. For example, the database object 128(1) may be a database table and a database administrator may endeavor to provide access to the database table to the consumers 112, 116, and 120 without use of the application 106 that manages the database object 128(1). As discussed herein, in some embodiments, the database object may be inaccessible at a database-level via the persistence system 102. As such, the administrator may classify the database object 128(1) as API exposable. In some embodiments, the database administrator may employ a command line interface (CLI) or graphical user interface (GUI) database schema editor application to classify the database object 128(1) as API exposable. Further, The CLI or GUI database schema editor may raise warnings whenever a developer wants to expose a source object that contains critical functionality, e.g. access to session variables, managed procedures (e.g., ABAP Managed Data Procedure (AMDP) content), etc.

Further, once the database object 128(1) has been classified as API exposable, modifications to the database object 128(1) may be restricted to prevent breaching the API contracts of API schemas (e.g., the API schemas 130(1)-(2)) associated with the database object 128(1). For example, the database engine 139 may receive a request from the consumer device 110(1) to remove or edit existing parameters, fields/elements, relationships to other database objects, and/or associated data types of the database object 128(1) via the application 106, and the validation module 148 may deny the request based on the database object 128(1) being classified as API exposable.

In 304, the persistence system may create an API schema for proxy access to database objects that have been identified as API exposable. For example, a schema administrator may endeavor to provide the consumers 112(1)-(N) access to the database table without use of the application based upon one or more attributes (e.g., role, employment organization, relevant workflows) of the consumers 112(1)-(N). The database administrator may grant the schema administrator the right to create and manage API schemas within the persistence system 102. Further, the schema administrator may create the API schema 130(1) for providing the database object 128(1) to the consumers 112(1)-(N).

Once the API schema 130(1) is created, two roles may be created with respect to the API schema 130(1). The first role may include privileges for direct consumers of the API objects, e.g. via SQL client tools, of the API schema. The second role may include privileges for consumers that require view building capabilities. Further, the schema administrator may assign the roles to the consumers 112(1)-(N) associated with the API schema 130(1). Additionally, or alternatively, the persistence system 102 may grant rights or roles to the consumers 108, 112, 116, and 120 based on one or more user attributes.

In 306, the persistence system may assign the database object to the API schema. For example, the schema administrator may employ an editor application to associate the API schema 130(1) to the database object 128(1). In some embodiments, the database administrator may grant the schema administrator the privilege to assign the database object 128(1) to an API schema. Although FIG. 1A illustrates that the API schema 130(1) is only associated with the database object 128(1), the API schema 130(1) may be assigned a plurality of database objects. Additionally, or alternatively, the persistence system 102 may automatically assign a database object 128 to an API schema 130.

In 308, the persistence system may generate an API object within the API schema based on the assigning, the API object corresponding to the database object. For example, the persistence system 102 may generate an API object 132(1) which internally redirects access to the database object 128(1) inside the application managed schema 126(1). The API object 132(1) may be a means of simplifying database-level privilege management for the consumers 108, 112, 116, and 120, and protecting the application managed schema 126(1) from external access. For instance, the API object 132(1) may be a SQL view or a projection view, which points to the database object 128(1) in the application managed schema 126(1).

In some embodiments, the persistence system 102 may generate the API object 132(1) as a projection view based on the database object 128(1) being a database table. In addition, the persistence system 102 may generate the API object 132(1) as a view based on the database object 128(1) being a database table that is split into tenant-specific and shared tables. Further, in some embodiments, the persistence system 102 may be a relational database with core data service (CDS) entities (e.g., views, table functions, hierarchies, etc.), and the persistence system 102 may generate the API object 132(1) as a SQL views based on the database object 128(1) being a CDS entity. As used herein, in some embodiments, a "CDS entity" may refer to an entity that includes a set of data elements that are organized using columns and rows. Additionally, the persistence system 102 may generate the API object 132(1) as a stored procedure/function based on the database object 128(1) being a stored procedure/function managed by the application managed schema 126.

As described in detail herein, creation of the API schema 130(1) may occur during an activation process. The activation process may include creating the API schema 130(1), creating the two schema-local database roles for the API schema 130(1), granting a technical account root granting privileges (e.g., grant CREATE ANY to administrator account in a SQL system) for the API schema 130(1), determining that database objects (e.g., the database object 128(1)) associated with the API schema 130(1) are active at an application layer, and trigger the creation or recreation of the API objects (e.g., the API object 132(1)) for the database objects assigned to the API schema. In some embodiments, the active process may be executed in response to the creation of the API schema 130(1), addition or modification of a new API object to the API schema 130(1), or a need to update the API object 132(1) to match a permitted modification to the database object 128(1). Further, in some embodiments, the persistence system may determine that the database object 128(1) is a lazily-created, and create the database object 128(1) and the corresponding API object 132(1).

In 310, the persistence system may provide, via the API schema and independent of the application, access to the API object by a privileged consumer. For example, the consumer devices 114(1)-(N) may send API requests to the persistence system 102 for the API object 132(1). In response, the persistence system 102 may send an API response including the API object 132(1) to the consumer devices 114(1)-(N) based upon the consumers 112(1)-(N) being associated with the API schema 130(1). Further, the consumer devices 110, 118, and 122 may not be permitted to access the API object 132(1) because the consumer devices 110, 118, and 122 are not associated with consumers that have been given privilege by the schema administrator to access the API schema 130(1) and/or the API object 132(1). As used herein, in some embodiments, "independent of the application" may refer to accessing the database objects 128(1)-(N) of the persistence system 102 via the API objects 132(1)-(N) without making a request of the application 106.

Figure 4:
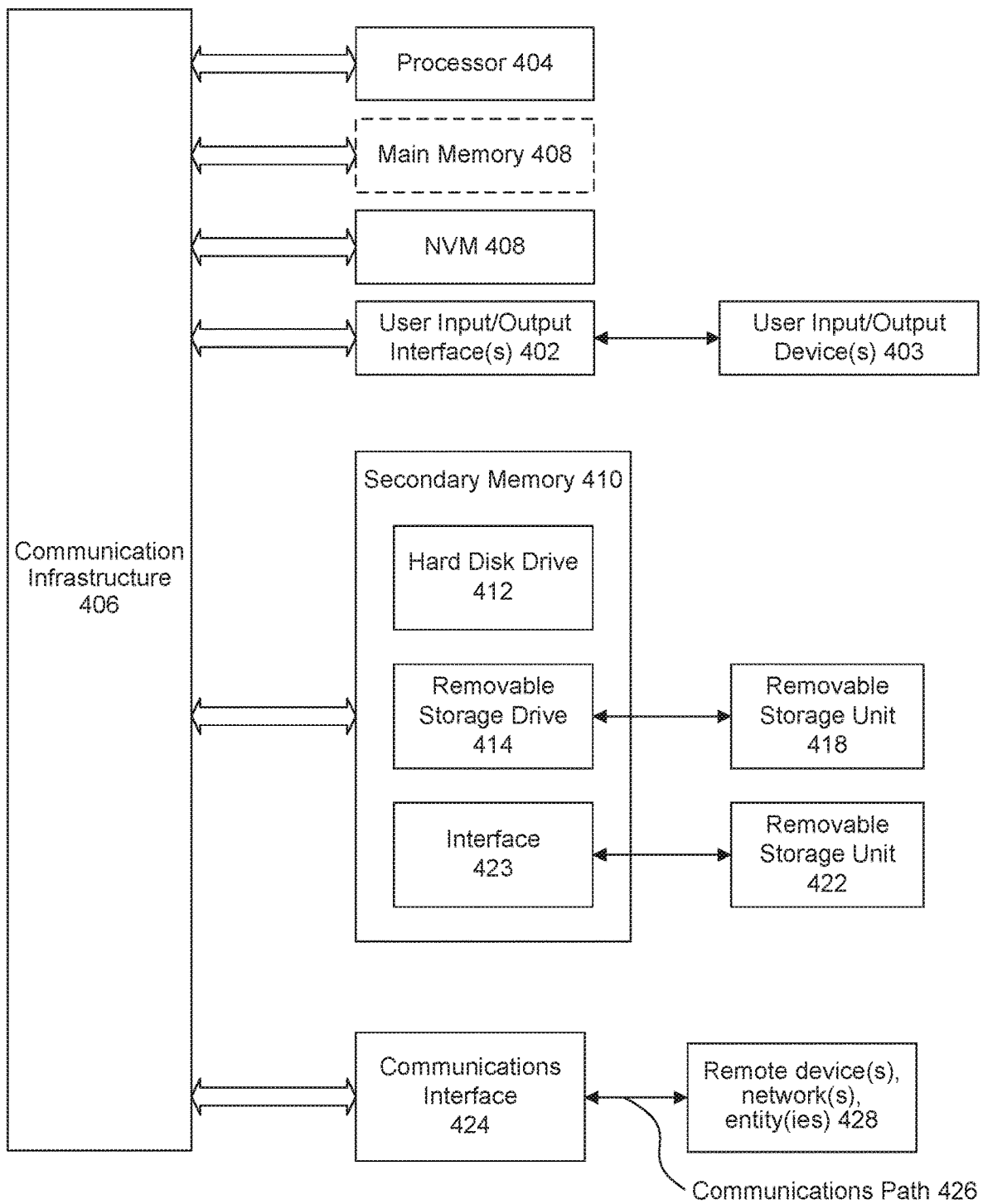
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    determining that a database object is classified as application programming interface (API) exposable, the database object managed by an application;
    creating an API schema for proxy access to database objects that have been identified as API exposable;
    assigning the database object to the API schema;
    generating an API object within the API schema based on the assigning, the API object corresponding to the database object;
    receiving a modification request associated with the database object;
    denying the modification request based at least in part on the database object being classified as API exposable; and
    providing, via the API schema and independent of the application, access to the API object by a privileged consumer.

2. The method of claim 1, wherein the API schema is a first API schema, the API object is a first API object, the privileged consumer is a first privileged consumer, the proxy access is first proxy access, and further comprising:
    creating a second API schema for second proxy access to the database objects that have been identified as API exposable, the first API schema associated with a first access privilege possessed by the first privileged consumer and the second API schema associated a second access privilege possessed by a second privileged consumer;
    assigning the database object to the second API schema;
    generating a second API object within the second API schema based on the assigning, the second API object corresponding to the database object; and
    providing, via the second API schema and independent of the application, access to the second API object by the second privileged consumer.

3. The method of claim 2, further comprising:
    denying, via the second API schema and independent of the application, access to the second API object by the first privileged consumer.

4. The method of claim 1, wherein the database object is a first database object, and the modification request includes at least one of:
    a request to modify or delete a relationship to a second database object.

5. The method of claim 1, wherein generating the API object within the API schema further comprises:
    generating a projection view, a database view, a database procedure, or a database function based on the database object.

6. The method of claim 1, wherein the API object is a first API object, and further comprising:
    generating a custom schema based on the API schema that provides a proxy access to the database objects that have been identified as API exposable, wherein the custom schema comprises a plurality of custom objects based on a second API object of the API schema; and
    providing access to a plurality of custom objects via the custom schema and independent of the application, wherein at least one of the plurality of custom objects comprises a view.

7. The method of claim 1, wherein the database object includes at least one of a database table, a database view, a database table function, a database hierarchy, or a database procedure.

8. A non-transitory computer-readable device having instructions stored thereon that, when executed by at least one computing device, cause the at least one computing device to perform operations comprising:
    determining that a database object is classified as application programming interface (API) exposable, the database object managed by an application;
    creating an API schema for proxy access to database objects that have been identified as API exposable;
    assigning the database object to the API schema;
    generating an API object within the API schema based on the assigning, the API object corresponding to the database object;
    receiving a modification request associated with the database object denying the modification request based at least in part on the database object being classified as API exposable; and
    providing, via the API schema and independent of the application, access to the API object by a privileged consumer.

9. The non-transitory computer-readable device of claim 8, wherein the API schema is a first API schema, the API object is a first API object, the privileged consumer is a first privileged consumer, the proxy access is first proxy access, and the operations further comprising:
    creating a second API schema for second proxy access to the database objects that have been identified as API exposable, the first API schema associated with a first access privilege possessed by the first privileged consumer and the second API schema associated a second access privilege possessed by a second privileged consumer;
    assigning the database object to the second API schema;
    generating a second API object within the second API schema based on the assigning, the second API object corresponding to the database object; and
    providing, via the second API schema and independent of the application, access to the second API object by the second privileged consumer.

10. The non-transitory computer-readable device of claim 9, the operations further comprising:

denying, via the second API schema and independent of the application, access to the second API object by the first privileged consumer.

11. The non-transitory computer-readable device of claim 8, wherein generating the API object within the API schema further comprises:
generating a projection view, a database view, a database procedure, or a database function based on the database object.

12. The non-transitory computer-readable device of claim 8, wherein the database object includes one of a database table, a database view, a database table function, a database hierarchy, or a database procedure.

13. A system, comprising:
a memory including a database object managed by an application; and
one or more processors and/or circuits coupled to the memory and configured to:
determine that the database object is classified as application programming interface (API) exposable;
create an API schema for proxy access to database objects that have been identified as API exposable;
assign the database object to the API schema;
generate an API object within the API schema based on the assigning, the API object corresponding to the database object;
receive a modification request associated with the database object;
deny the modification request based at least in part on the database object being classified as API exposable; and
provide, via the API schema and independent of the application, access to the API object by a privileged consumer.

14. The system of claim 13, wherein the API schema is a first API schema, the API object is a first API object, the privileged consumer is a first privileged consumer, the proxy access is first proxy access, and the one or more processors and/or circuits are configured to:
create a second API schema for second proxy access to the database objects that have been identified as API exposable, the first API schema associated with a first access privilege possessed by the first privileged consumer and the second API schema associated a second access privilege possessed by a second privileged consumer;
assign the database object to the second API schema;
generate a second API object within the second API schema based on the assigning, the second API object corresponding to the database object; and
provide, via the second API schema and independent of the application, access to the second API object by the second privileged consumer.

15. The system of claim 14, wherein the one or more processors and/or circuits are configured to deny, via the second API schema and independent of the application, access to the second API object by the first privileged consumer.

16. The system of claim 13, wherein the one or more processors and/or circuits are configured to:
receive a modification request associated with the database object; and
deny the modification request based at least in part on the database object being classified as API exposable.

17. The system of claim 13, wherein the database object includes one of a database table, a database view, a database table function, a database hierarchy, or a database procedure.

18. The system of claim 13, wherein to generate the API object within the API schema, the one or more processors and/or circuits are configured to generate a projection view, a database view, a database procedure, or a database function based on the database object.

19. The system of claim 1, wherein the creating comprises:
creating two roles for the API schema, including both a first role that provides direct access to the API schema and a second role that both provides direct access to the API schema and provides view building capabilities; and
assigning the second role to the database account.

* * * * *